United States Patent
Kusayanagi et al.

(10) Patent No.: US 11,338,824 B2
(45) Date of Patent: May 24, 2022

(54) SURROUNDING SITUATION DISPLAY METHOD AND SURROUNDING SITUATION DISPLAY DEVICE

(71) Applicant: Nissan Motor Co., Ltd., Yokohama (JP)

(72) Inventors: Yoshinori Kusayanagi, Kanagawa (JP); Seigo Watanabe, Kanagawa (JP); Takura Yanagi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 194 days.

(21) Appl. No.: 16/633,999

(22) PCT Filed: Jul. 28, 2017

(86) PCT No.: PCT/JP2017/027444
§ 371 (c)(1),
(2) Date: Jan. 24, 2020

(87) PCT Pub. No.: WO2019/021458
PCT Pub. Date: Jan. 31, 2019

(65) Prior Publication Data
US 2020/0353948 A1    Nov. 12, 2020

(51) Int. Cl.
*B60W 60/00*    (2020.01)
*B60W 50/14*    (2020.01)

(52) U.S. Cl.
CPC .......... *B60W 60/001* (2020.02); *B60W 50/14* (2013.01); *B60W 2050/146* (2013.01); *B60W 2554/80* (2020.02)

(58) Field of Classification Search
CPC ............... B60W 60/001; B60W 50/14; B60W 2554/80; B60W 2050/146
See application file for complete search history.

(56) References Cited

U.S. PATENT DOCUMENTS

| | | | |
|---|---|---|---|
| 9,092,987 B2 | 7/2015 | Bone et al. | |
| 2014/0067250 A1* | 3/2014 | Bone ...................... | G08G 1/167 701/301 |
| 2017/0329328 A1* | 11/2017 | Horita ................... | G05D 1/0061 |

FOREIGN PATENT DOCUMENTS

| | | |
|---|---|---|
| JP | H01122000 A | 5/1989 |
| JP | 2003157493 A | 5/2003 |
| JP | 200724599 A | 2/2007 |
| JP | 2016-130971 A | 7/2016 |
| JP | 201774918 A | 4/2017 |
| JP | 2017-84112 A | 5/2017 |
| WO | 2012160590 A1 | 11/2012 |
| WO | 2017064798 A1 | 4/2017 |

* cited by examiner

*Primary Examiner* — Mahmoud S Ismail
*Assistant Examiner* — Gabriel Anfinrud
(74) *Attorney, Agent, or Firm* — Young Basile Hanlon & MacFarlane, P.C.

(57) ABSTRACT

A surrounding situation display method of detecting a surrounding situation around a host vehicle with an autonomous driving function and displaying the detected surrounding situation, includes displaying, in a varying display bar that has a prescribed display frame and displays an indication position within the display frame in synchronization with movement of an attention target, the indication position having moved to one endpoint of the varying display bar as a timing when an action of the host vehicle is changed by the autonomous driving function.

12 Claims, 12 Drawing Sheets

SURROUNDING SITUATION DISPLAY METHOD AND SURROUNDING SITUATION DISPLAY DEVICE

TECHNICAL FIELD

The present invention relates to a surrounding situation display method and a surrounding situation display device for detecting a situation around a host vehicle and displaying the detected situation.

BACKGROUND

A technique disclosed in Japanese Patent Application Publication No. 2016-130971, for example, has been known as a technique for notifying an occupant of a mode change during travel by autonomous driving. In Japanese Patent Application Publication No. 2016-130971, the time to be taken before travel control by autonomous driving changes is calculated and is displayed on a screen in the form of a numerical value to notify the occupant of the timing of the change.

SUMMARY

In Japanese Patent Application Publication No. 2016-130971, in which the timing when the travel control by autonomous driving changes is displayed in the form of a numerical value, if the occupant glances at the displayed numerical value and counts down with his or her own sense of time, there can be a gap between the occupant's countdown and the countdown displayed on the screen. Hence, the occupant may possibly fail to properly recognize the timing when an action of the vehicle changes.

The present invention has been made to solve such a conventional problem, and an object thereof is to provide a surrounding situation display method and a surrounding situation display device capable of properly notifying an occupant of the timing of the action change by autonomous driving.

In an aspect of the present invention, a timing when an action of a host vehicle is changed by an autonomous driving function is displayed in a varying display bar that has a prescribed display frame and displays an indication position within the display frame while shifting the indication position.

According to an aspect of the present invention, it is possible to properly notify an occupant of the timing of an action change by autonomous driving.

DESCRIPTION OF EMBODIMENTS

An embodiment of the present invention will be described below with reference to the drawings.

Description of Configuration in Embodiment

Figure 1:
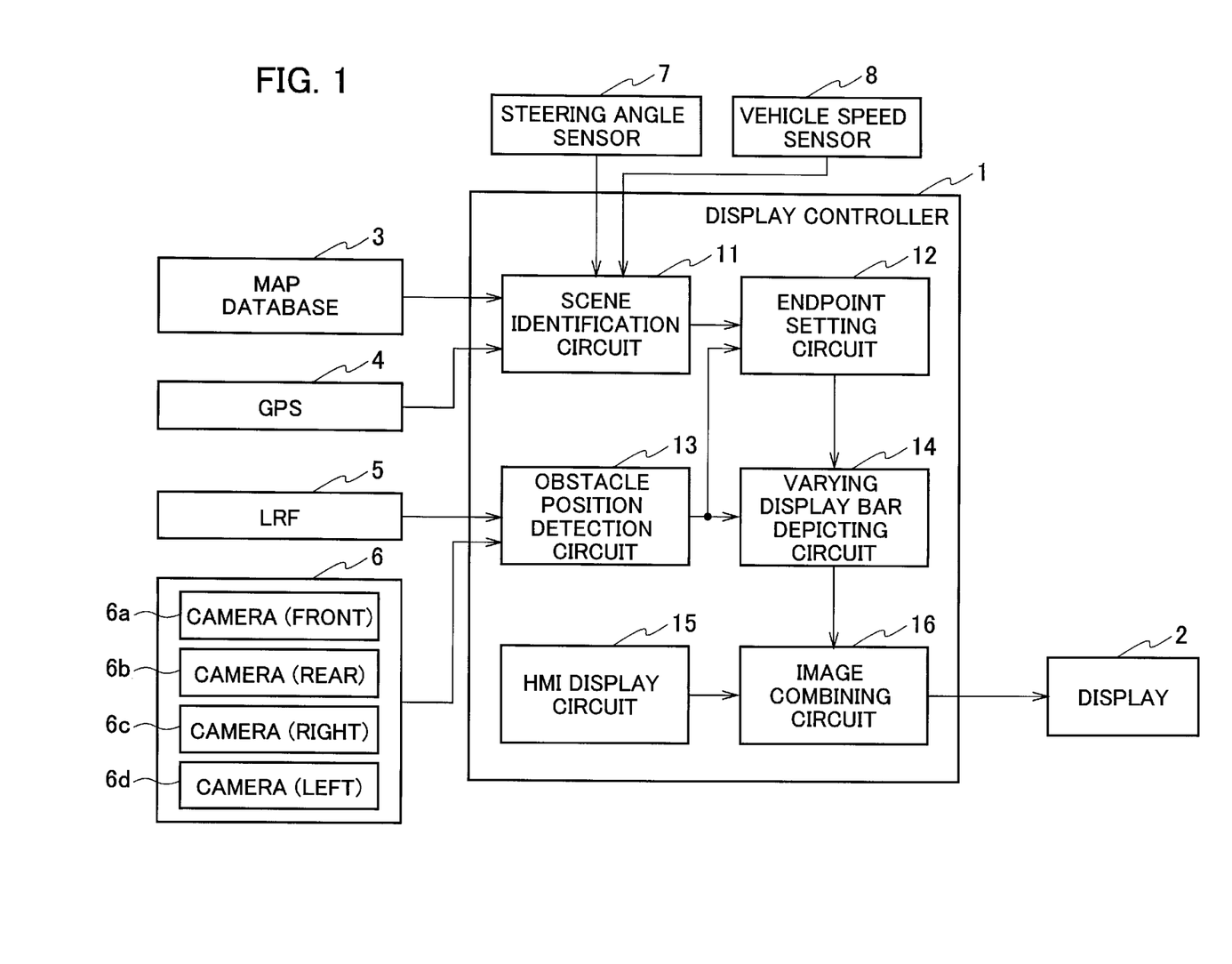
FIG. 1 is a block diagram illustrating the configuration of a display device according to an embodiment of the present invention.

FIG. 1 is a block diagram illustrating the configuration of a display device according to an embodiment of the present invention. This display device is installed on a vehicle having an autonomous driving function. Note that autonomous driving in this embodiment refers to a state of controlling, for example, at least the accelerator among actuators such as the brake, the accelerator, and the steering without the driver's operation. Thus, the other actuators may be actuated by the driver's operation.

As illustrated in FIG. 1, the display device includes a display controller 1, a display 2 that displays an image, a map database 3, a GPS device 4 (Global Positioning System), an LRF 5 (Laser Range Finder), cameras 6, a steering angle sensor 7, and a vehicle speed sensor 8.

The display controller 1 includes a scene identification circuit 11, an endpoint setting circuit 12, an obstacle position detection circuit 13, a varying display bar depicting circuit 14, an HMI display circuit 15, and an image combining circuit 16.

The GPS device 4 detects the current position of the vehicle and outputs the detected position information to the scene identification circuit 11. The map database 3 stores three-dimensional map data covering the area around the vehicle. The map data is outputted to the scene identification circuit 11.

The LRF 5 emits an infrared laser beam to a target object and measures the distance to the target object on the basis of the intensity of the reflected beam. By the measurement by the LRF 5, the distance to the target object can be obtained as point cloud information, and this point cloud information is outputted to the scene identification circuit 11. Meanwhile, instead of the LRF 5, a clearance sonar using ultrasonic waves, a millimeter wave radar, a camera, road-to-vehicle communication, vehicle-to-vehicle communication, or the like can be used to detect a target object. The output data of the LRF 5 is outputted to the obstacle position detection circuit 13.

The cameras 6 include a front camera 6a, a rear camera 6b, a right camera 6c, and a left camera 6d, and capture images of front, rear, right, and left sides around the vehicle. Each camera 6 (6a to 6c) is a camera including an image capture element such as a CCD or a CMOS. The camera 6 outputs the captured image data to the obstacle position detection circuit 13.

The steering angle sensor 7 detects the steering angle of the vehicle and outputs the detected steering angle to the scene identification circuit 11. Also, the vehicle speed sensor 8 detects the speed of the vehicle from the number of revolutions of a wheel and outputs the detected speed to the scene identification circuit 11.

Figure 9:
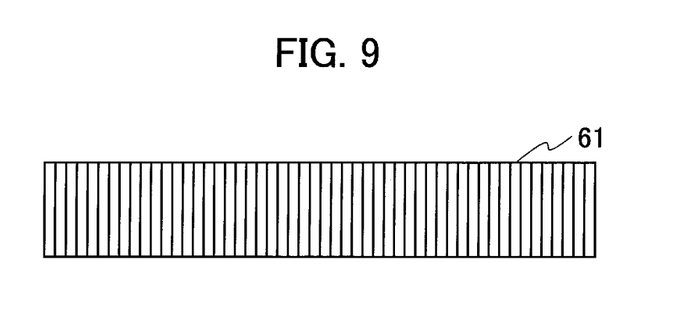
FIG. 9 is an explanatory diagram illustrating a segment display.

As the display 2, an image monitor, such as a liquid crystal display, is usable. Also, various display means are available such as a segment display as illustrated in FIG. 9, provided with a plurality of light emitting diodes 61, and a head-up display.

The scene identification circuit 11 identifies situations where an action of the vehicle traveling by autonomous driving is to change. "Changing of the action" refers to an action such as moving from a stop, accelerating, decelerating, turning right, turning left, or turning the steering wheel (for merging at high speed). Examples of specific situations where the action changes include patterns such as entering a freeway, changing the lane, waiting for a pedestrian at a crosswalk, turning right or left at an intersection, and moving after waiting for an oncoming vehicle. The scene identification circuit 11 identifies each of the above action changes on the basis of the three-dimensional map data, the current vehicle position data, the steering angle data, and the vehicle speed data. The scene identification circuit 11 outputs the action change pattern to the endpoint setting circuit 12.

The obstacle position detection circuit 13 detects the positions of obstacles such as other vehicles, pedestrians, and animals present around the host vehicle on the basis of the detection data of the LRF 5 and the images captured by the cameras 6 (6a to 6d). For example, the obstacle position detection circuit 13 detects other vehicles approaching from the right or left while the host vehicle is stopping at an intersection. The obstacle position detection circuit 13 also detects oncoming vehicles from ahead. Further, the obstacle position detection circuit 13 detects obstacles such as pedestrians and animals walking around the vehicle. The obstacle position detection circuit 13 outputs information on the position of each detected obstacle to the endpoint setting circuit 12 and the varying display bar depicting circuit 14.

In a situation where the action of the vehicle traveling by autonomous driving is to change, an image of the vehicle and its surroundings (bird's eye view) is displayed. When this surrounding image is displayed, the endpoint setting circuit 12 sets two endpoints as the starting point and the terminating point of a varying display bar to be displayed in the surrounding image.

The varying display bar depicting circuit 14 depicts the varying display bar in the image on the basis of the endpoints set by the endpoint setting circuit 12, the positional relation between the vehicle and the obstacle, and their relative speed. As indicated by reference sign Q3 in FIG. 4A, for example, the varying display bar has a rectangular shape long in a certain direction (the horizontal direction in FIG. 4A) and displays the timing when the action of the vehicle controlled by autonomous driving changes by shifting an indication point (indication position). Specifically, the varying display bar has the function of displaying the timing when the action of the host vehicle changes, in synchronization with the situation around the host vehicle.

The varying display bar depicting circuit 14 depicts the varying display bar in the surrounding image on the basis of the surrounding image, the current position of the host vehicle, and the position of the obstacle. In this embodiment, the varying display bar depicting circuit 14 indicates the indication point as a colored region in the entire region of the displayed frame. For example, the varying display bar depicting circuit 14 shifts a region displayed in red in the entire displayed frame to display a timing when the host vehicle changes its action.

The HMI display circuit 15 generates various images indicating information on autonomous driving during travel by the autonomous driving and outputs them to the image combining circuit 16.

The image combining circuit 16 combines the images related to the autonomous driving, set by the HMI display circuit 15, to the surrounding image with the varying display bar depicted therein and displays the combined image on the display 2.

Note that the above-described display controller 1 can be implemented using a microcomputer including a CPU (central processing unit), a memory, and an input-output unit. A computer program (display program) for causing the microcomputer to function as the display controller 1 is installed into the microcomputer and executed. In this way, the microcomputer functions as the plurality of information processing circuits included in the display controller 1 (11 to 16). Note that although a case of implementing the display controller 1 with software is discussed here, it is of course possible to configure the display controller 1 by preparing dedicated hardware. Also, the plurality of circuits included in the display controller 1 may be configured using individual pieces of hardware. Further, an electronic control unit (ECU) used for other control processes for the vehicle may be used also as the display controller 1. Furthermore, besides the LRF 5, the cameras 6, and the display 2, the components illustrated in FIG. 1 do not have to be installed on the vehicle, and various pieces of data may be obtained via communication with base stations.

[Display Examples of Shifting Display Bar]

Next, specific display examples of the varying display bar to be displayed in the surrounding image will be described.

(1) Case of Merging into Traffic Lane on Freeway

Figure 2A:
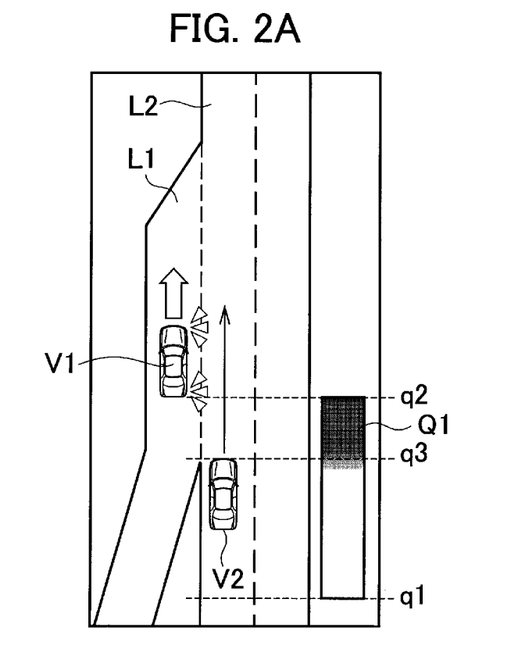
FIG. 2A represents a display example illustrating a first situation in which the host vehicle is to merge from an acceleration lane on a freeway into a traffic lane to enter a space behind another vehicle.
Figure 2B:
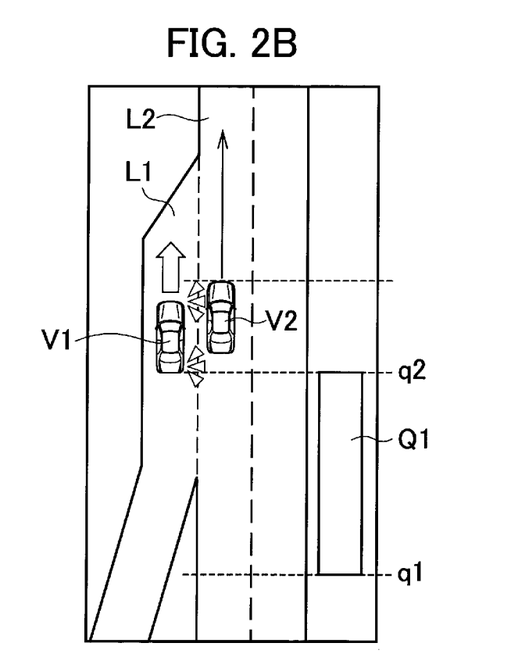
FIG. 2B represents a display example illustrating a second situation in which the host vehicle is to merge from the acceleration lane on the freeway into the traffic lane to enter the space behind the other vehicle.
Figure 3A:
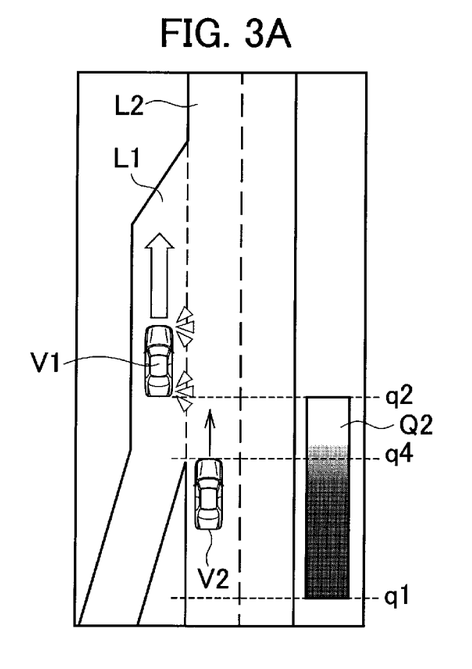
FIG. 3A represents a display example illustrating a first situation in which the host vehicle is to merge from an acceleration lane on a freeway into a traffic lane to enter a space in front of another vehicle.
Figure 3B:
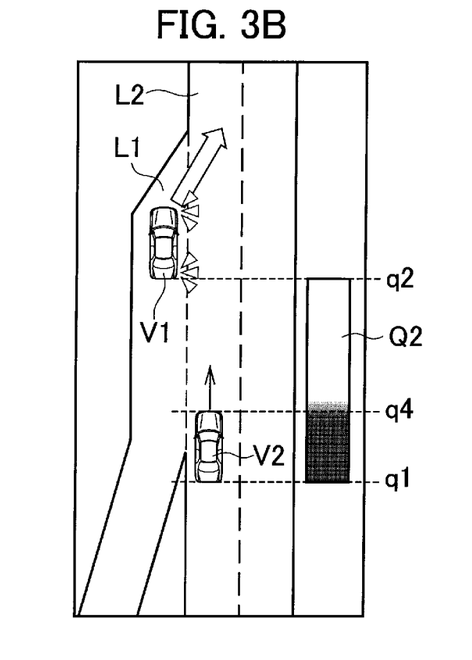
FIG. 3B represents a display example illustrating a second situation in which the host vehicle is to merge from the acceleration lane on the freeway into the traffic lane to enter the space in front of the other vehicle.

FIGS. 2A and 2B and FIGS. 3A and 3B are diagrams illustrating situations where a host vehicle V1 is to merge into a traffic lane L2 on a freeway from an acceleration lane L1, as situations where the action of the host vehicle V1 is to change. As illustrated in FIGS. 2A and 3A, another vehicle V2 is traveling behind the host vehicle V1 in the traffic lane L2. In the merging, there are two cases, one in which the host vehicle V1 enters a space behind the other vehicle V2 and the other in which the host vehicle V1 enters a space in front of the other vehicle V2. FIGS. 2A and 2B illustrate the case of entering a rear space while FIGS. 3A and 3B illustrate the case of entering a front space. Whether to enter a front space or to enter a rear space is determined on the basis of the relative speed of the host vehicle V1 and the other vehicle V2.

As illustrated in FIGS. 2A and 2B, in the case of entering a space behind the other vehicle V2, a varying display bar Q1 is displayed in a surrounding image of the surroundings of the host vehicle V1 with one endpoint q1 of the varying display bar set at the position behind the rear end of the host vehicle V1 separated by a prescribed distance and the other endpoint q2 set at the position of the rear end of the host vehicle V1. In doing so, the display position is a position not overlapping any traffic roads in the image and oriented in the direction parallel to the direction of advance of the host vehicle V1. Note that the distance to the endpoint q1 is set to any suitable distance from the host vehicle V1.

In the varying display bar Q1, an indication point q3 is set at the position of the front end of the other vehicle V2, and the region from the endpoint q2, as an origin point, to the indication point q3 is colored. In doing so, a region around the indication point q3 is displayed with a gradation. The colored region displayed in the varying display bar Q1 indicates the relative distance between the host vehicle V1 and the other vehicle V2. As illustrated in FIG. 2B, as the other vehicle V2 approaches the host vehicle V1, the indication point q3 approaches the endpoint q2, so that the colored region narrows. When the colored region in the varying display bar Q1 disappears as illustrated in FIG. 2B, the occupant of the host vehicle V1 can recognize the timing when the other vehicle V2 passes the host vehicle V1. Thus, the occupant can intuitively recognize the timing when the host vehicle V1 makes a lane change to the traffic lane L2 (the timing when the action of the host vehicle V1 changes) and therefore be prepared for the event in which the host vehicle V1 performs the action of entering the traffic lane L2 from the acceleration lane L1.

Note that the endpoint q2 of the varying display bar Q1 moves within the image with the travel of the host vehicle V1. In the example of FIGS. 2A and 2B, the display position of the varying display bar Q1 moves such that the rear end of the host vehicle V1 is aligned with the endpoint q2.

On the other hand, as illustrated in FIGS. 3A and 3B, in the case where the host vehicle V1 is to enter a space in front of the other vehicle V2, a varying display bar Q2 having endpoints q1 and q2 is displayed in the image of the surroundings of the host vehicle V1. An indication point q5 indicates the position of the front end of the other vehicle V2, and the region from the endpoint q1, as an origin point, to the indication point q4 is colored. With the endpoint q1 as the origin point of the colored region, the occupant can recognize that the host vehicle V1 is merging into a space in front of the other vehicle V2. Further, as illustrated in FIG. 3B, as the inter-vehicle distance between the host vehicle V1 and the other vehicle V2 widens, the position of the indication point q5 approaches the endpoint q1, so that the colored region narrows. By looking at the narrowing colored region, the occupant can intuitively recognize the timing when the host vehicle V1 makes a lane change to the traffic lane L2 and therefore be prepared for the event in which the host vehicle V1 performs the action of entering the traffic lane L2 from the acceleration lane L1.

Figure 4A:
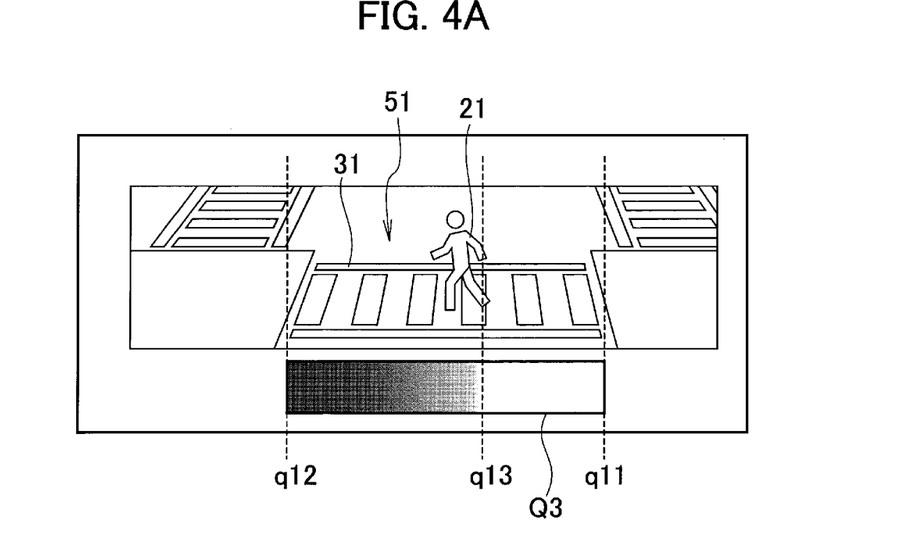
FIG. 4A represents a first display example of a situation in which the host vehicle is waiting for a pedestrian to finish crossing a crosswalk.
Figure 4B:
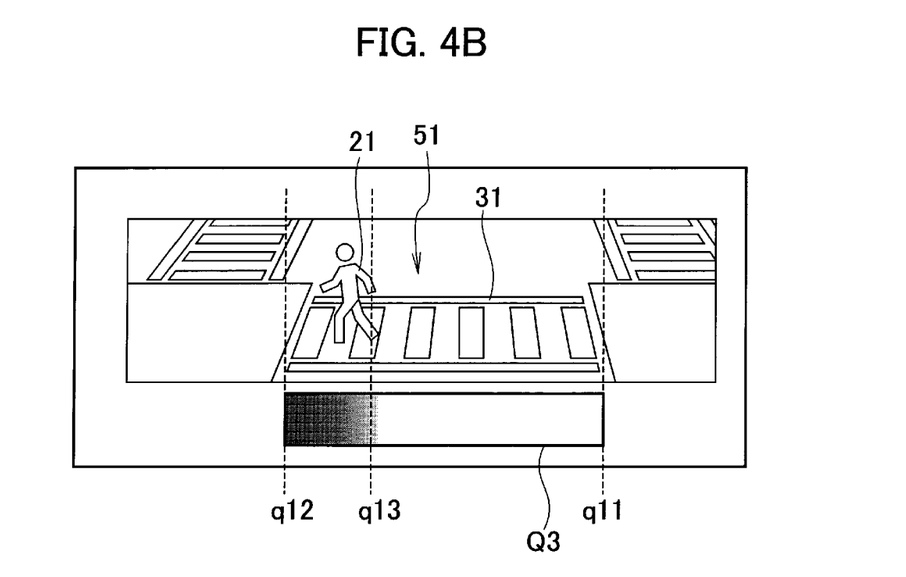
FIG. 4B represents a second display example of the situation in which the host vehicle is waiting for the pedestrian to finish crossing the crosswalk.

(2) Case of Starting Traveling after Waiting for Pedestrian(s) to Cross Crosswalk at Intersection FIGS. 4A and 4B are diagrams illustrating a situation where the host vehicle V1 has stopped at a stop line at an intersection 51 and a pedestrian 21 is walking on a crosswalk 31 ahead from the right to the left in the diagrams, as a situation where the action of the host vehicle V1 changes.

In this case, the host vehicle V1 starts traveling when the pedestrian 21 finishes crossing the crosswalk 31. As illustrated in FIG. 4A, a varying display bar Q3 is displayed with endpoints q11 and q12 set at the opposite ends of the crosswalk 31 in an image of the front side from the host vehicle V1. The varying display bar Q3 is displayed in parallel to the crosswalk 31.

Here, the region from the endpoint q12 on the left side of the crosswalk 31 as an origin point to an indication point q13 indicating the position of the pedestrian 21 is colored. As illustrated in FIG. 4B, as the pedestrian 21 walks on the crosswalk 31, the indication point q13 in the varying display bar Q3 moves from the right to the left, and the host vehicle V1 starts traveling when the pedestrian 21 reaches the endpoint q12. Specifically, the distance from the endpoint q12 to the indication point q13, displayed in the varying display bar Q3, is set according to the positions of the host vehicle V1 and the attention target. With the change of the color region, the occupant can intuitively recognize the timing when the host vehicle V1 starts traveling (the timing when the action of the host vehicle V1 changes). The occupant can therefore be prepared for the event in which the host vehicle V1 switches from stopping to traveling forward.

Figure 5A:
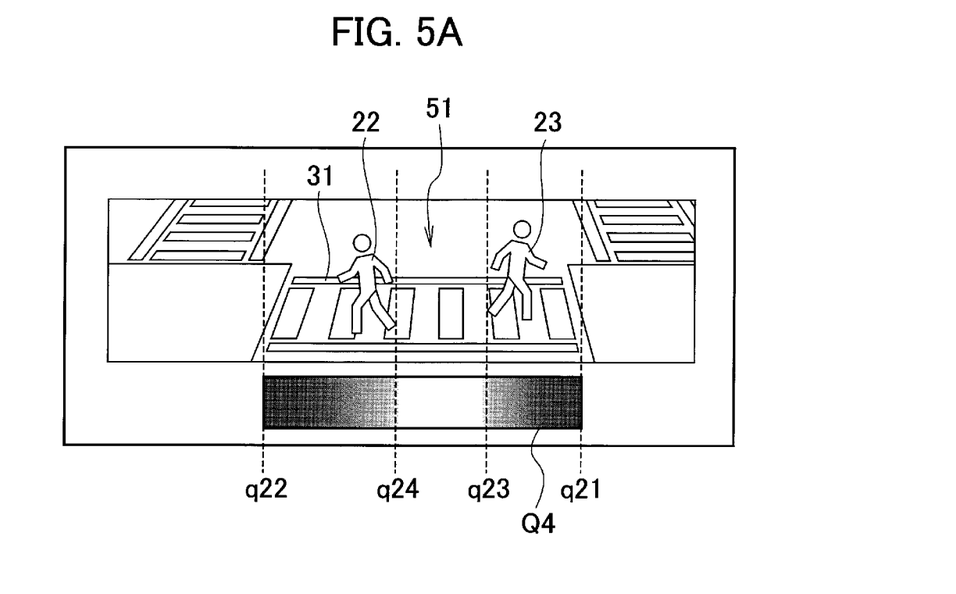
FIG. 5A represents a first display example of a situation in which the host vehicle is waiting for two pedestrians to finish crossing a crosswalk.
Figure 5B:
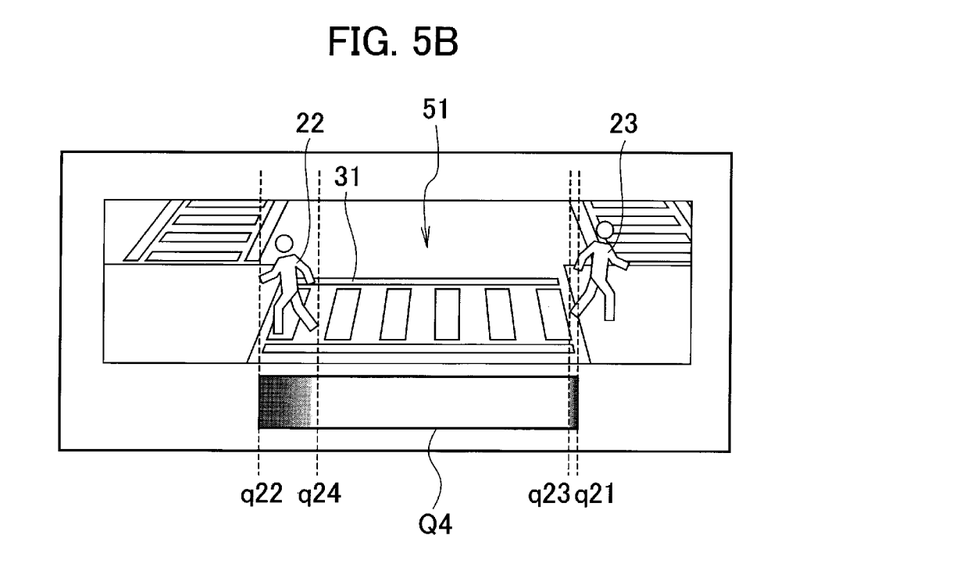
FIG. 5B represents a second display example of the situation in which the host vehicle is waiting for the two pedestrians to finish crossing the crosswalk.

FIGS. 5A and 5B are diagrams illustrating a situation where two pedestrians 22 and 23 are walking on the crosswalk 31 ahead in different directions of advance.

In this case, the host vehicle V1 starts traveling when both two pedestrians 22 and 23 finish crossing the crosswalk 31. As illustrated in FIG. 5A, a varying display bar Q4 is displayed with endpoints q21 and q22 set at the opposite ends of the crosswalk 31 in an image of the front side from the host vehicle V1. The varying display bar Q4 is displayed in parallel to the crosswalk 31.

Here, the region from the endpoint q22 on the left side of the crosswalk 31 as an origin point to an indication point q24 indicating the position of the pedestrian 22 is colored. Further, the region from the endpoint q21 on the right side as an origin point to an indication point q23 indicating the position of the pedestrian 23 is colored.

As illustrated in FIG. 5B, as the pedestrians 22 and 23 walk on the crosswalk 31, the indication point q24 in the varying display bar Q4 moves from the right to the left, and the indication point q23 in the varying display bar Q4 moves from the left to the right. The host vehicle V1 starts traveling when the indication point q24 reaches the endpoint q22 and the indication point q23 reaches the endpoint q21. With the changes of the color regions, the occupant can recognize the timing when the host vehicle V1 starts traveling. The occupant can therefore be prepared for the event in which the host vehicle V1 switches from stopping to traveling forward.

Figure 6A:
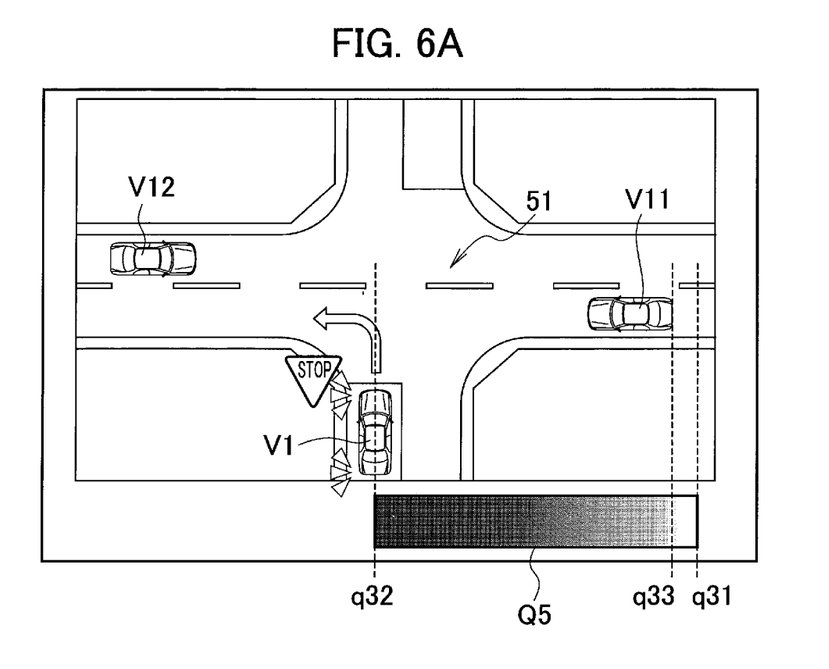
FIG. 6A represents a first display example of a situation in which the host vehicle is waiting for passage of another vehicle approaching from the right when attempting to turn left at an intersection.
Figure 6B:
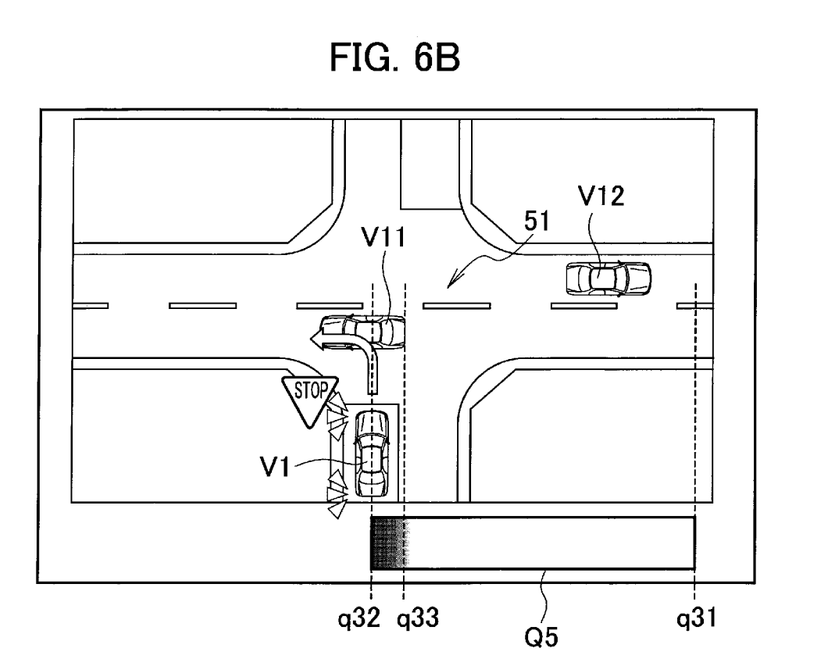
FIG. 6B represents a second display example of the situation in which the host vehicle is waiting for passage of the other vehicle approaching from the right when attempting to turn left at the intersection.

(3) Case of Starting Left Turn at Intersection after Waiting for Passage of a Passing Vehicle from Right FIGS. 6A and 6B are diagrams illustrating a situation where the host vehicle V1 is to turn left at the intersection 51, as a situation where the action of the host vehicle V1 is to change.

In this case, the host vehicle V1 starts traveling when another vehicle V11 approaching the intersection 51 from the right finishes passing the intersection 51. As illustrated in FIG. 6A, a varying display bar Q5 is displayed with one endpoint q32 set at the position of the host vehicle V1 in a surrounding image and the other endpoint q31 set at a prescribed position on the right side. The varying display bar Q5 is displayed in parallel to the direction of advance of the other vehicle V11.

Here, the region in the varying display bar Q5 from the endpoint q32 as an origin point to an indication point q33 indicating the position of the other vehicle V11 is colored. As illustrated in FIG. 6B, as the other vehicle V11 approaches the intersection 51, the indication point q33 in the varying display bar Q5 moves from the right to the left, and the host vehicle V1 starts traveling when the indication point q33 reaches the endpoint q31. With the change of the colored region, the occupant can recognize the timing when the host vehicle V1 starts traveling and therefore be prepared for the event in which the host vehicle V1 switches from stopping to traveling forward.

Note that another vehicle V12 illustrated in FIGS. 6A and 6B, approaching from the left, is not an obstacle to the left turn of the host vehicle V1, and is therefore not recognized as an attention target.

Figure 7A:
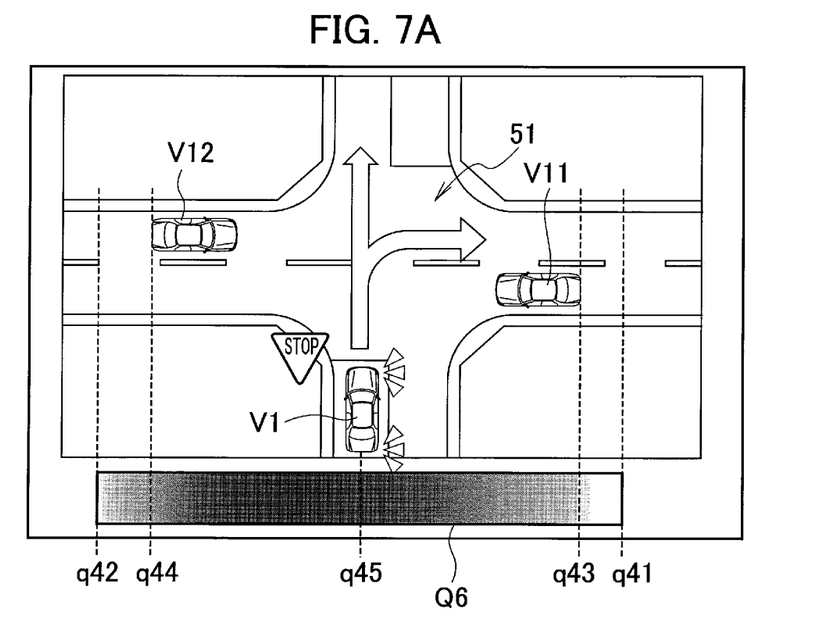
FIG. 7A represents a first display example of a situation in which the host vehicle is waiting for passage of other vehicles approaching from the right and left when attempting to turn right at an intersection.
Figure 7B:
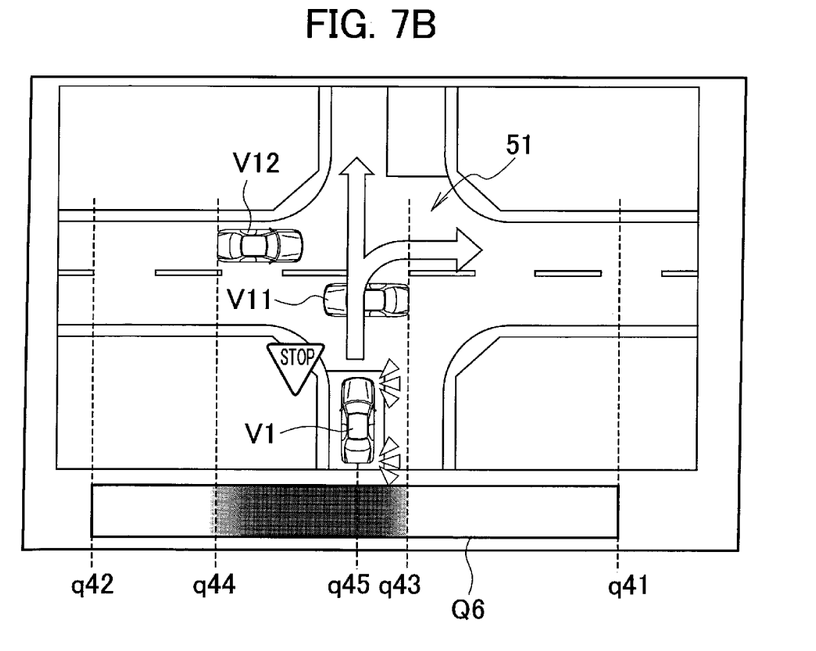
FIG. 7B represents a second display example of the situation in which the host vehicle is waiting for passage of the other vehicles approaching from the right and left when attempting to turn right at the intersection.

(4) Case of Turning Right or Moving Straight at Intersection after Waiting for Passage of Passing Vehicles from Left and Right FIGS. 7A and 7B are diagrams illustrating a situation where the host vehicle V1 is to turn right at the intersection 51 after waiting for passage of other vehicles from the right and the left, as a situation where the action of the host vehicle V1 is to change.

In this case, the host vehicle V1 starts traveling (turning right) when both the other vehicle V11, approaching the intersection 51 from the right, and the other vehicle V12, approaching the intersection 51 from the left, finish passing the intersection 51. As illustrated in FIG. 7A, a varying display bar Q6 is displayed with one endpoint q42 set at a prescribed position on the left side of a surrounding image and the other endpoint q41 set at a prescribed position on the right side of the surrounding image is displayed. The varying display bar Q6 is displayed in parallel to the direction of advance of the other vehicles V11 and V12.

Here, the region in the varying display bar Q6 from a point q45 as an origin point indicating the position of the host vehicle V1 to an indication point q43 indicating the position of the other vehicle V11 is colored. Further, the region from the point q45 to an indication point q44 indicating the position of the other vehicle V12 is colored. As illustrated in FIG. 7B, as the other vehicles V11 and V12 approach the intersection 51, the indication point q43 in the varying display bar Q6 moves from the right to the left and the indication point q44 in the varying display bar Q6 moves from the left to the right, and the host vehicle V1 starts traveling when the indication points q43 and q44 reach the point q45. With the changes of the colored regions, the occupant can recognize the timing when the host vehicle V1 starts traveling and therefore be prepared for the event in which the host vehicle V1 switches from stopping to traveling forward.

Figure 8A:
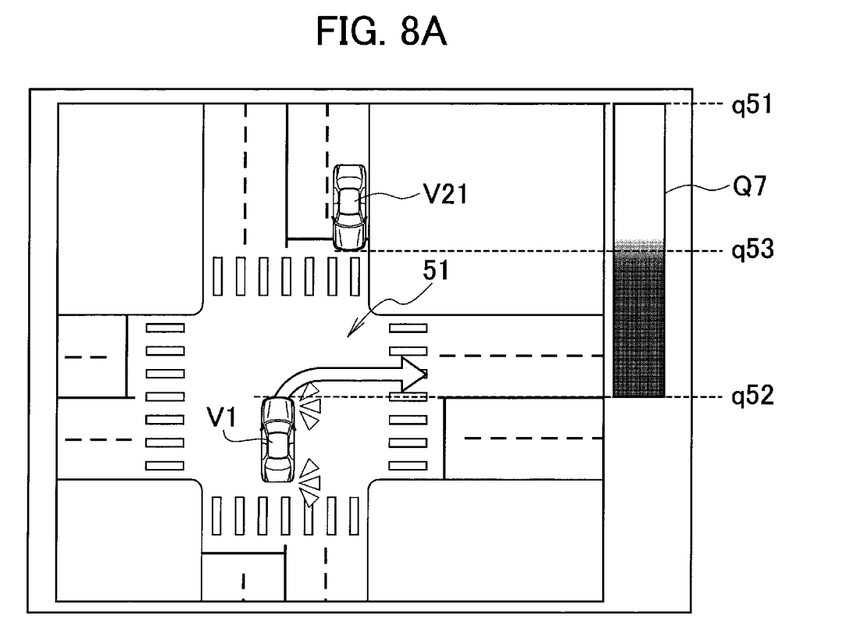
FIG. 8A represents a first display example of a situation in which the host vehicle is waiting for passage of an oncoming vehicle when attempting to turn right at an intersection.
Figure 8B:
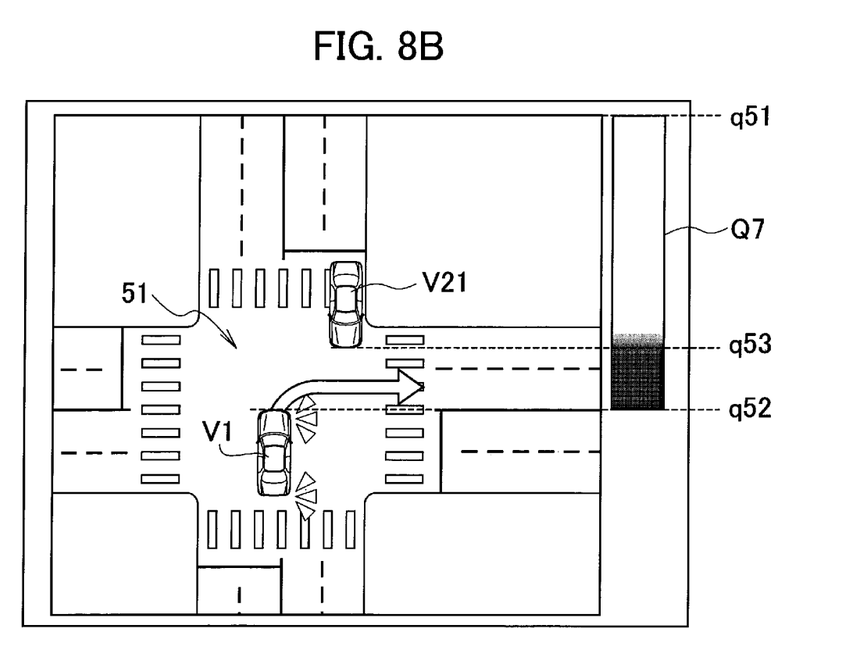
FIG. 8B represents a second display example of the situation in which the host vehicle is waiting for passage of the oncoming vehicle when attempting to turn right at the intersection.
Figure 8C:
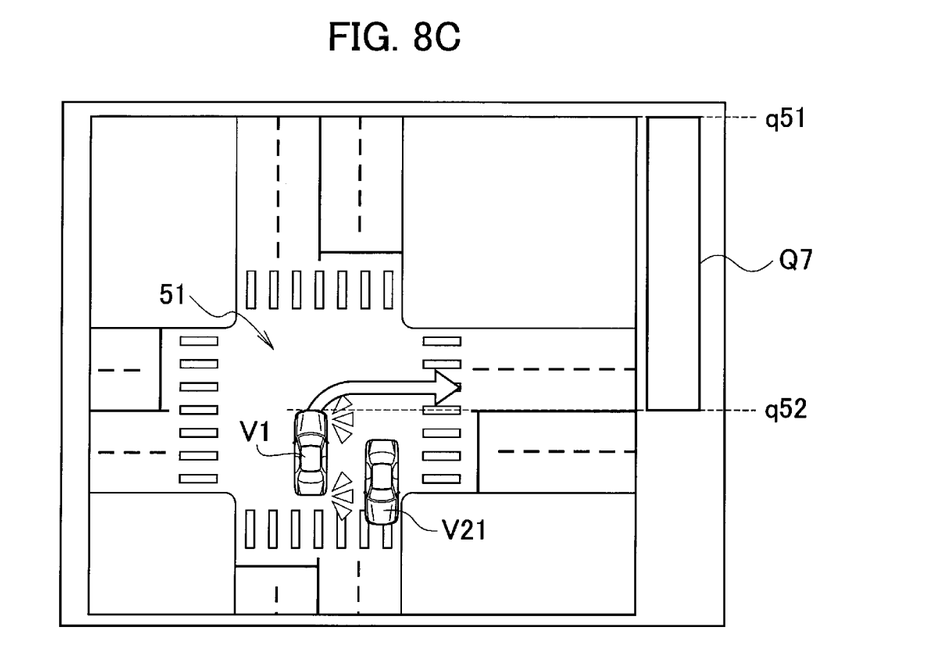
FIG. 8C represents a third display example of the situation in which the host vehicle is waiting for passage of the oncoming vehicle when attempting to turn right at the intersection.

(5) Case of Turning Right at Intersection after Waiting for Passage of Oncoming Vehicle FIGS. 8A, 8B, and 8C are diagrams illustrating a situation where the host vehicle V1 is to turn right at the intersection 51 after waiting for passage of an oncoming vehicle, as a situation where the action of the host vehicle V1 is to change.

In this case, the host vehicle V1 starts traveling (turning right) when an oncoming vehicle V21 approaching the intersection 51 from ahead finishes passing the intersection 51. As illustrated in FIG. 8A, a varying display bar Q7 is displayed with one endpoint q52 set at the position of the front end of the host vehicle V1 in a surrounding image and the other endpoint q51 set at a prescribed position ahead in the surrounding image. The varying display bar Q7 is displayed in parallel to the direction of advance of the oncoming vehicle V21.

Here, the region in the varying display bar Q7 from the endpoint q52 as an origin point, indicating the position of the front end of the host vehicle V1, to an indication point q53 indicating the position of the oncoming vehicle V21 is colored. As illustrated in FIG. 8B, as the oncoming vehicle V21 approaches the intersection 51, the indication point q53 in the varying display bar Q7 moves from the top to the bottom. As illustrated in FIG. 8C, the host vehicle V1 starts traveling when the oncoming vehicle V21 finishes passing the intersection 51. With the change of the colored region, the occupant can recognize the timing when the host vehicle V1 starts traveling and therefore be prepared for the event in which the host vehicle V1 switches from stopping to traveling forward.

Note that FIGS. 6A and 6B, FIGS. 7A and 7B, and 8A to 8C illustrate examples where the vehicles travel on the left-hand side. Right and left are reversed in the case of the right-hand side traffic.

Description of Operation in this Embodiment

Next, the operation in this embodiment will be described with reference to a flowchart illustrated in FIGS. 10A, 10B, and 10C. The process is executed by the display controller 1, illustrated in FIG. 1. First, in step S11, it is determined whether the host vehicle V1 is traveling by autonomous driving. If the host vehicle V1 is traveling by autonomous driving (YES in step S11), it is determined in step S12 whether the host vehicle V1 is decelerating or has stopped.

If the host vehicle V1 is decelerating or has stopped (YES in step S12), the scene identification circuit 11 identifies the scene the host vehicle V1 is in on the basis of the map data in step S13. Further, in step S14, the obstacle position detection circuit 13 detects obstacles present around the host vehicle V1 such as other vehicles, pedestrians, and animals. The obstacle position detection circuit 13 identifies, among the detected obstacles, the obstacle that has caused the vehicle's deceleration or stop as an attention target.

In step S15, the scene identification circuit 11 determines whether the current scene is stopping at an intersection or is merging or lane change on the basis of the map data and the current vehicle position data.

If the current scene is merging or lane change, the obstacle position detection circuit 13 detects the next lane and another vehicle traveling in the next lane in step S16. Specifically, as illustrated in FIGS. 2A and 3A, the obstacle position detection circuit 13 detects the other vehicle V2, traveling in the traffic lane L2.

As illustrated in FIGS. 2A and 2B, the endpoint setting circuit 12 and the varying display bar depicting circuit 14 set a varying display bar along the direction from the other vehicle V2 toward the host vehicle V1 (vertical direction in FIGS. 2A and 2B) in step S17, and further set the two endpoints of the varying display bar in step S18. Specifically, the endpoint setting circuit 12 and the varying display bar depicting circuit 14 set the varying display bar Q1 with the endpoints q1 and q2, illustrated in FIGS. 2A and 2B, and display the varying display bar Q1 at a position not overlapping any lanes in the image. In doing so, the varying display bar is set such that the rear end of the host vehicle V1 and the endpoint q1 are aligned with each other in the direction of advance of the vehicles. The varying display bar Q2 is also displayed similarly in the example illustrated in FIGS. 3A and 3B.

Figure 10A:
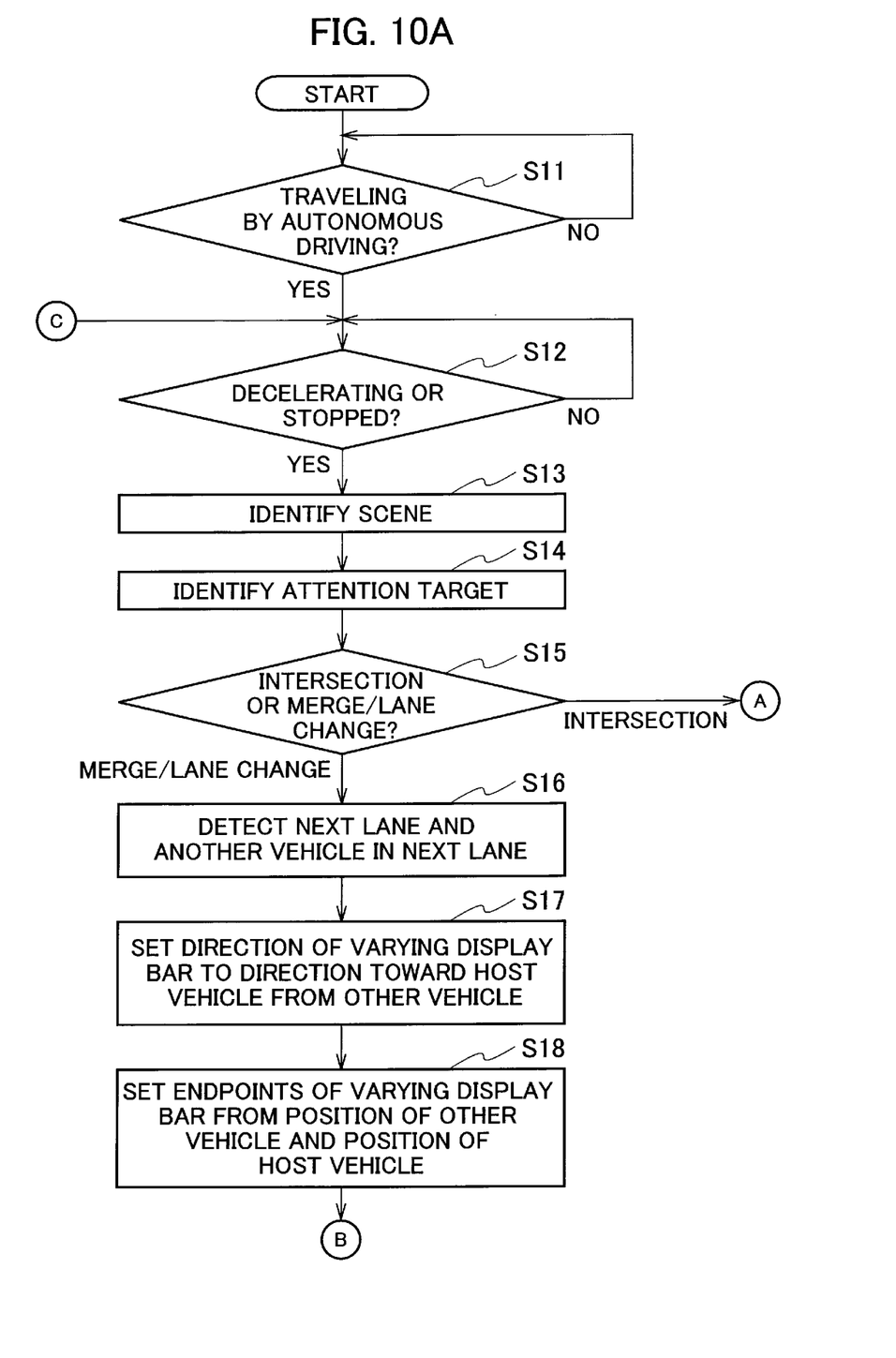
FIG. 10A is a first part of a flowchart illustrating the flow of a process by the display device according to the embodiment.
Figure 10B:
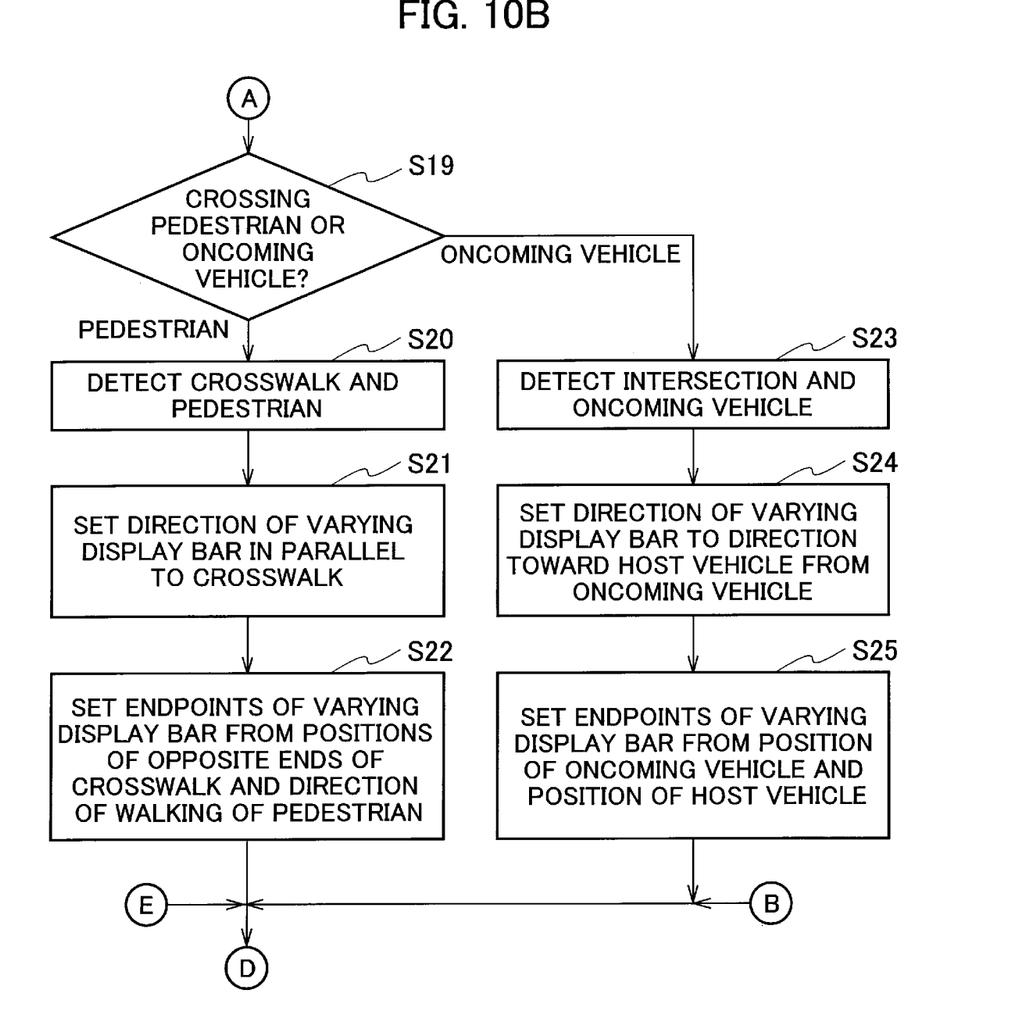
FIG. 10B is a second part of the flowchart illustrating the flow of the process by the display device according to the embodiment.
Figure 10C:
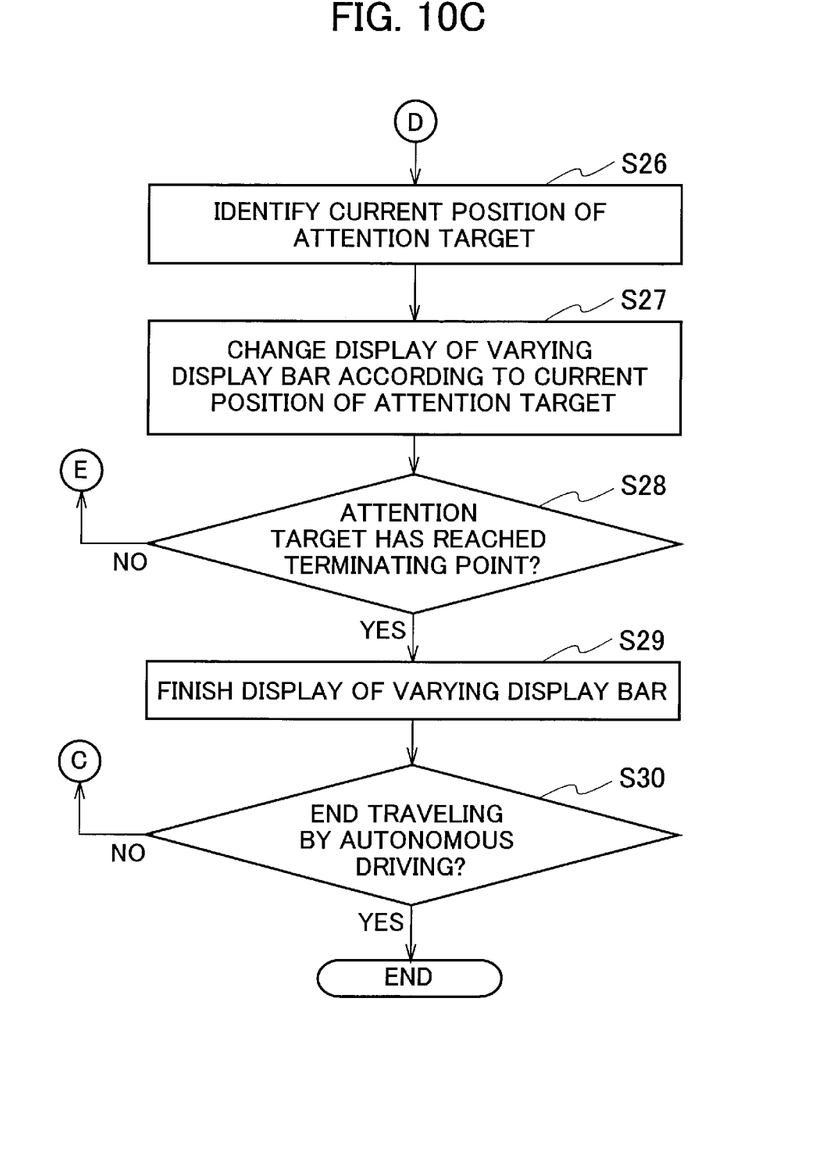
FIG. 10C is a third part of the flowchart illustrating the flow of the process by the display device according to the embodiment.

Then, the current position of the attention target is identified in step S26 in FIG. 10C. Specifically, as illustrated in FIG. 2A, the other vehicle V2, traveling behind the host vehicle V1 in the traffic lane L2, is identified as an attention target.

In step S27, the varying display bar depicting circuit 14 shifts the indication point q3 in the varying display bar Q1, thereby varying the colored region, according to the current position of the other vehicle V2 (attention target). As mentioned earlier, by looking at the change of the colored region in the varying display bar Q1 or Q2, the occupant of the host vehicle can recognize the timing when the host vehicle V1 changes the lane and also whether the host vehicle V1 enters a space in front of the other vehicle V2 or enters a space behind the other vehicle V2.

In step S28, it is determined whether the other vehicle V2 has reached the terminating point of the varying display bar Q1. If the other vehicle V2 has reached the terminating point, the display of the varying display bar is finished in step S29.

In step S30, it is determined whether to end the travel by the autonomous driving function, and this process is ended if the travel by the autonomous driving function is to be ended.

On the other hand, if the result of the determination process in step S15 in FIG. 10A is "INTERSECTION", it is determined whether the attention target is a pedestrian walking on a crosswalk or an oncoming vehicle in step S19 in FIG. 10B.

If the attention target is determined to be a pedestrian, the obstacle position detection circuit 13 detects the position of the crosswalk and the position of the pedestrian in step S20. For example, as illustrated in FIG. 4A, the crosswalk 31 and the pedestrian 21 in an image of the front side from the host vehicle V1 are detected.

The endpoint setting circuit 12 and the varying display bar depicting circuit 14 set the orientation of a varying display bar in the direction parallel to the crosswalk 31 in step S21 and further set the ends of the varying display bar on the basis of the positions of the opposite ends of the crosswalk 31 in step S22. In the example illustrated in FIG. 4A, the endpoint setting circuit 12 and the varying display bar depicting circuit 14 display the varying display bar Q3. Further, the endpoint setting circuit 12 and the varying display bar depicting circuit 14 set the origin point of the colored region on the basis of the direction of walking of the pedestrian. In FIG. 4A, the endpoint setting circuit 12 and the varying display bar depicting circuit 14 set the endpoint q12 as the origin point.

Thereafter, in step S26 in FIG. 10C, the current position of the attention target is identified. Specifically, as illustrated in FIG. 4A, the pedestrian 21, walking on the crosswalk 31, is identified as an attention target.

In step S27, the varying display bar depicting circuit 14 varies the display position in the varying display bar Q3 according to the current position of the pedestrian 21 (attention target). Specifically, the varying display bar depicting circuit 14 changes the display position of the indication point q13 in FIG. 4A to the display position in FIG. 4B. Thus, by looking at the change of the colored region in the varying display bar Q3, the occupant can recognize the timing when the host vehicle V1 starts traveling.

Note that in the example illustrated in FIGS. 5A and 5B too, the occupant can recognize the timing when the host vehicle V1 starts traveling by similarly varying the display of the varying display bar Q4. Subsequently, the processes in steps S28 to S30 are performed similarly to the above.

On the other hand, if the result of the determination process in step S19, illustrated in FIG. 10B, is "ONCOMING VEHICLE", the obstacle position detection circuit 13 detects the position of the intersection and the position of the oncoming vehicle in step S23. For example, as illustrated in FIG. 8A, the obstacle position detection circuit 13 detects the oncoming vehicle V21 in an oncoming lane in an image of the surroundings of the host vehicle V1.

The endpoint setting circuit 12 and the varying display bar depicting circuit 14 set the orientation of a varying display bar in the direction parallel to the direction of travel of the oncoming vehicle V21 in step S24, and further set the starting point and the terminating point and display the varying display bar Q7 in step S25.

Then, in step S26, the current position of the attention target is identified. Specifically, as illustrated in FIG. 8A, the oncoming vehicle V21 is identified as the attention target.

In step S27, the varying display bar depicting circuit 14 shifts the indication point q53, displayed in the varying display bar Q7, according to the current position of the oncoming vehicle V21. Specifically, the varying display bar depicting circuit 14 shifts the indication point q53 as in FIG. 8A, FIG. 8B, and FIG. 8C in this order. As mentioned earlier, by looking at the change of the colored region in the varying display bar Q7, the occupant of the host vehicle V1 can recognize the timing when the host vehicle V1 starts traveling. Subsequently, the processes in steps S28 to S30 are performed similarly to the above.

In the flowchart illustrated in FIGS. 10A, 10B, and 10C, a description has been given of the process in cases of making a lane change illustrated in FIGS. 2A and 2B and FIGS. 3A and 3B, for waiting for a pedestrian to finish crossing a crosswalk illustrated in FIGS. 4A and 4B and FIGS. 5A and 5B, and for waiting for an oncoming vehicle illustrated in FIGS. 8A, 8B and 8C. Note, however, that it is possible to indicate a timing when the action of the host vehicle V1 changes also in the case of turning left at an intersection as illustrated in FIGS. 6A and 6B and in the case of turning right at an intersection as illustrated in FIGS. 7A and 7B, by displaying a varying display bar and changing its colored region according to the movement of the attention target through a process similar to the above.

Description of Advantageous Effects

This embodiment with the above configuration offers the following advantageous effects.

(1) A timing when the action of the host vehicle V1 is to be changed by the autonomous driving function of the host vehicle V1, e.g., a timing when the host vehicle V1 changes the lane or starts traveling at an intersection is displayed in synchronization with the situation around the host vehicle V1. The occupant can therefore intuitively recognize the timing when the action changes. This reduces a sense of incongruity felt by the occupant.

(2) A timing when the action of the host vehicle V1 changes is displayed by a varying display bar with an indication point (indication position) that shifts within the entire displayed frame in synchronization with the surrounding situation. The occupant can thus figure out the change of the surrounding situation until the timing when the action of the host vehicle V1 changes, and therefore properly figure out the timing of the action change.

(3) A timing when the action of the host vehicle V1 changes is displayed on the basis of the relative distance between the host vehicle V1 and an attention target, such as another vehicle. Thus, when the attention target is a trigger that changes the action of the host vehicle V1, the timing of the action change is displayed in synchronization with the positional relation between the host vehicle V1 and the attention target. The occupant can therefore more properly figure out the timing of the action change.

(4) The distance from an end of the varying display bar to the indication point displayed therein is set according to the positions of the host vehicle V1 and the attention target. Thus, when the attention target is a trigger that changes the action of the host vehicle V1, the timing of the action change is displayed in synchronization with the positional relation between the host vehicle V1 and the attention target. The occupant can therefore more properly figure out the timing of the action change.

(5) The movement in the varying display bar and the direction of movement of the attention target correspond to each other. Thus, when the attention target is a trigger that changes the action of the host vehicle V1, the timing of the change is displayed in the direction of movement of the attention target. The occupant can therefore more properly figure out the timing of the action change.

(6) The direction of the movement in the varying display bar and the direction of the movement of the attention target are aligned with each other. Thus, the occupant can view the displayed varying display bar without a sense of incongruity relative to the direction of movement of the attention target and therefore more properly figure out the timing of an action change.

(7) The positions of the ends of the varying display bar and the position of the attention target are aligned with each other. Thus, the display of the attention target and the display of the varying display bar are easily associated with each other. The occupant can therefore more properly figure out the timing of an action change.

(8) The varying display bar is displayed with a gradation, which enables the current position of the attention target to be displayed indefinitely to a certain extent. Therefore, even when the movement of the attention target varies, the occupant can still properly figure out the timing of the action change.

Note that the timings of action changes in this embodiment include any timings when the action or behavior of the vehicle changes, such as a timing when the vehicle starts moving, a timing when the vehicle stops, a timing when the vehicle starts accelerating, a timing when the vehicle starts decelerating, a timing when the steering angle changes, a timing when the angular speed of the steering angle changes, a timing when the vehicle starts a right or left turn, a timing when the vehicle finishes a right or left turn, a timing when the vehicle starts a lane change, and a timing when the vehicle finishes a lane change.

Although an embodiment of the present invention has been described above, it should not be understood that the statement and the drawings constituting part of this disclosure limit this invention. Various alternative embodiments, examples, and operation techniques will become apparent to those skilled in the art from this disclosure.

REFERENCE SIGNS LIST 1 display controller
2 display
3 map database
4 GPS device
5 LRF
6 camera
7 steering angle sensor
8 vehicle speed sensor
11 scene identification circuit
12 endpoint setting circuit
13 obstacle position detection circuit
14 varying display bar depicting circuit
15 display circuit
16 image combining circuit

The invention claimed is:

1. A surrounding situation display method comprising:
    detecting an attention target rearward of a host vehicle in a next lane of the host vehicle or forward of the host vehicle with an autonomous driving function;
    displaying the host vehicle and the detected attention target on a display;
    displaying on the display a varying display bar that has a prescribed display frame and displays an indication position within the prescribed display frame in synchronization with a movement of the attention target;
    displaying, in the varying display bar, the indication position having moved to one endpoint of the varying display bar as a timing of a change of an action of the host vehicle by the autonomous driving function; and
    displaying the indication position such that a position of an end of the attention target and the indication position of the varying display bar in a direction of the movement of the attention target are aligned with each other in the direction of the movement of the attention target.

2. The surrounding situation display method according to claim 1, further comprising shifting the indication position within the prescribed display frame according to a relative distance between the host vehicle and the attention target.

3. The surrounding situation display method according to claim 1, further comprising setting a distance from one end of the varying display bar to the indication position according to positions of the host vehicle and the attention target.

4. The surrounding situation display method according to claim 1, further comprising making a movement in the varying display bar and the direction of the movement of the attention target correspond to each other.

5. The surrounding situation display method according to claim 4, further comprising aligning a direction of the movement in the varying display bar with the direction of the movement of the attention target.

6. The surrounding situation display method according to claim 4, further comprising aligning a position of an end of the varying display bar with a position of the attention target.

7. The surrounding situation display method according to claim 1, further comprising displaying the indication position in the varying display bar with a gradation.

8. The surrounding situation display method according to claim 1, further comprising displaying on the display an image of the attention target including the end of the attention target in the direction of the movement of the attention target.

9. A surrounding situation display device for detecting an attention target rearward of a host vehicle in a next lane of the host vehicle or forward of the host vehicle with an autonomous driving function and displaying the host vehicle and the attention target on a display, the surrounding situation display device comprising the display configured to:

display, in a varying display bar that has a prescribed display frame and displays an indication position within the prescribed display frame in synchronization with a movement of the attention target, the indication position having moved to one endpoint of the varying display bar as a timing of a change of an action of the host vehicle by the autonomous driving function; and display the indication position such that a position of an end of the attention target and the indication position of the varying display bar in a direction of the movement of the attention target are aligned with each other in the direction of the movement of the attention target.

10. The surrounding situation display device according to claim 9, wherein the display is further configured to display an image of the attention target including the end of the attention target in the direction of the movement of the attention target.

11. A surrounding situation display method comprising:

detecting an attention target rearward of a host vehicle in a next lane of the host vehicle or forward of the host vehicle with an autonomous driving function;

displaying the host vehicle and the detected attention target on a display;

allowing a user to recognize a timing of a change of an action of the host vehicle by the autonomous driving function by displaying on the display a varying display bar that has a prescribed display frame and displays an indication position within the prescribed display frame in synchronization with a movement of the attention target and by moving the indication position in the varying display bar; and displaying the indication position such that a position of an end of the attention target and the indication position of the varying display bar in a direction of the movement of the attention target are aligned with each other in the direction of the movement of the attention target on the display.

12. The surrounding situation display method according to claim 11, further comprising displaying on the display an image of the attention target including the end of the attention target in the direction of the movement of the attention target.

* * * * *